United States Patent
Oreifej et al.

(10) Patent No.: US 10,311,626 B2
(45) Date of Patent: Jun. 4, 2019

(54) SYSTEM AND METHOD FOR IDENTIFYING GRAPHICS WORKLOADS FOR DYNAMIC ALLOCATION OF RESOURCES AMONG GPU SHADERS

(71) Applicant: Advanced Micro Devices, Inc., Sunnyvale, CA (US)

(72) Inventors: Rashad Oreifej, Orlando, FL (US); Angel E. Socarras, Orlando, FL (US); Mark Russell Anderson, Orlando, FL (US); Randy Wayne Ramsey, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 122 days.

(21) Appl. No.: 15/297,611

(22) Filed: Oct. 19, 2016

(65) Prior Publication Data

US 2018/0108166 A1 Apr. 19, 2018

(51) Int. Cl.
  *G06T 15/50* (2011.01)
  *G06T 15/00* (2011.01)
  *G06F 9/38* (2018.01)

(52) U.S. Cl.
  CPC ............. *G06T 15/005* (2013.01); *G06F 9/38* (2013.01)

(58) Field of Classification Search
  CPC ....... G06T 15/005; G06T 15/80; G09G 5/363; G09G 2360/08; G09G 2360/16
  See application file for complete search history.

(56) References Cited

U.S. PATENT DOCUMENTS

| 7,755,630 | B2 | 7/2010 | Woo et al. |
| 8,223,158 | B1 | 7/2012 | Lindholm et al. |
| 2007/0091089 | A1* | 4/2007 | Jiao ...................... G06T 15/005 345/426 |
| 2007/0143765 | A1 | 6/2007 | Aridor et al. |
| 2011/0285709 | A1 | 11/2011 | Mejdrich et al. |
| 2015/0379661 | A1 | 12/2015 | Surti et al. |

(Continued)

FOREIGN PATENT DOCUMENTS

WO   2009146721 A1   12/2009

OTHER PUBLICATIONS

U.S. Appl. No. 15/298,026, filed Oct. 19, 2016, listing Angel E. Socarras as inventor, entitled "System and Method for Dynamically Allocating Resources Among GPU Shaders".

(Continued)

*Primary Examiner* — Hau H Nguyen (57) ABSTRACT

A GPU filters graphics workloads to identify candidates for profiling. In response to receiving a graphics workload for the first time, the GPU determines if the graphics workload would require the GPU shaders to use fewer resources than would be spent profiling and determining a resource allocation for subsequent receipts of the same or a similar graphics workload. The GPU can further determine if the shaders are processing more than one graphics workload at the same time, such that the performance characteristics of each individual graphics workload cannot be effectively isolated. The GPU then profiles and stores resource allocations for a plurality of shaders for processing the filtered graphics workloads, and applies those stored resource allocations when the same or a similar graphics workload is received subsequently by the GPU.

20 Claims, 4 Drawing Sheets

(56) References Cited

U.S. PATENT DOCUMENTS

| | | |
|---|---|---|
| 2016/0071230 A1 | 3/2016 | Patel et al. |
| 2016/0163015 A1 | 6/2016 | Riguer et al. |
| 2016/0364827 A1 | 12/2016 | Schluessler et al. |

OTHER PUBLICATIONS

Non-Final Office Action dated Dec. 21, 2017 for U.S. Appl. No. 15/298,026, 12 pages.

International Search Report and Written Opinion dated Jan. 23, 2018 for PCT Application No. PCT/US2017/056992, 13 pages.

Final Office Action dated Jun. 7, 2018 for U.S. Appl. No. 15/298,026, 30 pages.

* cited by examiner

SYSTEM AND METHOD FOR IDENTIFYING GRAPHICS WORKLOADS FOR DYNAMIC ALLOCATION OF RESOURCES AMONG GPU SHADERS

BACKGROUND

Description of the Related Art

Graphics processing units (GPUs) are used in a wide variety of processors to facilitate the processing and rendering of objects for display. The GPU includes a plurality of processing elements, referred to as shaders, to execute instructions, thereby creating images for output to a display. Typically, an incoming instruction set, referred to as a graphics workload, will make varying demands on the shaders of the GPU, such that some shaders may take a much longer time to complete their assigned tasks for a given workload than other shaders take to complete their assigned tasks. Such a workload imbalance can create a processing bottleneck at the GPU and therefore have a detrimental impact on overall processing efficiency. Further, in certain applications, particular graphics workloads are repeatedly processed by the shaders. It can therefore be useful to characterize the processing demands particular graphics workloads place on each of the shaders and create a profile of (i.e., to "profile") each graphics workload's processing demands. Such profiling can, for example, facilitate adjustment in the programming of workloads to more efficiently use system resources. However, certain graphics workloads are not susceptible to accurate profiling, or do not place sufficient processing demands on the shaders for the likely benefit of adjusting system resources based on the profiling information to exceed the resource cost of profiling.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for filtering graphics workloads to identify those graphics workloads that are candidates for profiling, profiling and determining resource allocations among a plurality of shaders of a GPU for processing the filtered graphics workloads, and applying those stored resource allocations when the same or a similar graphics workload is received subsequently by the GPU. In many graphics applications, the same or a similar graphics workload may be received by the GPU repeatedly. Accordingly, the processing demands of the graphics workload are profiled, and a resource allocation based on the profile that assigns resources such as applied voltage, clock frequency, and memory allocations for each shader for each graphics workload is stored. The resource allocation can be recalled and applied for subsequent processing of the same or a similar graphics workload. The GPU can thus dynamically adapt the resource allocations among shaders to more efficiently process subsequent graphics workloads. However, the GPU also expends resources to profile graphics workloads and determine resource allocations. For some workloads, the improvements to processing efficiency by employing a stored resource allocation are exceeded by the resource costs in profiling the workload or in adjusting resource allocations. Accordingly, filtering graphics workloads to identify candidates for profiling improves performance by allowing the GPU to reserve the resources used for profiling and generating resource allocations for only those graphics workloads that meet filtering criteria and to apply a default resource allocation for those graphics workloads that do not meet filtering criteria.

To illustrate, some graphics workloads require the GPU shaders to use fewer resources than would be spent profiling and determining a resource allocation for subsequent receipts of the same or a similar graphics workload. Additionally, in some circumstances, more than one graphics workload is processed by the shaders at the same time, resulting in overlapping workloads occupying the shaders. When the shaders are processing more than one graphics workload at the same time, it is not possible to effectively isolate the performance characteristics of each individual graphics workload. Therefore, in response to receiving a graphics workload with a given identifier for the first time, the GPU employs a performance monitor to screen, or filter, the graphics workload for characteristics that make the graphics workload a candidate for profiling and determination of a resource allocation.

For those graphics workloads that qualify for profiling a resource allocation determination, the performance monitor measures performance characteristics from the plurality of shaders for processing the workload. The GPU then aggregates the measured performance characteristics and calculates a resource allocation for the workload based on the aggregated performance characteristics. The GPU then stores the resource allocation with a workload identifier. In response to subsequently receiving a graphics workload with the given identifier, the GPU retrieves the stored resource allocation for the graphics workload, and applies the resource allocation for processing the graphics workload. By applying the stored resource allocation to qualified workloads, the GPU can reduce processing bottlenecks and improve overall processing efficiency of the processor.

Figure 1:
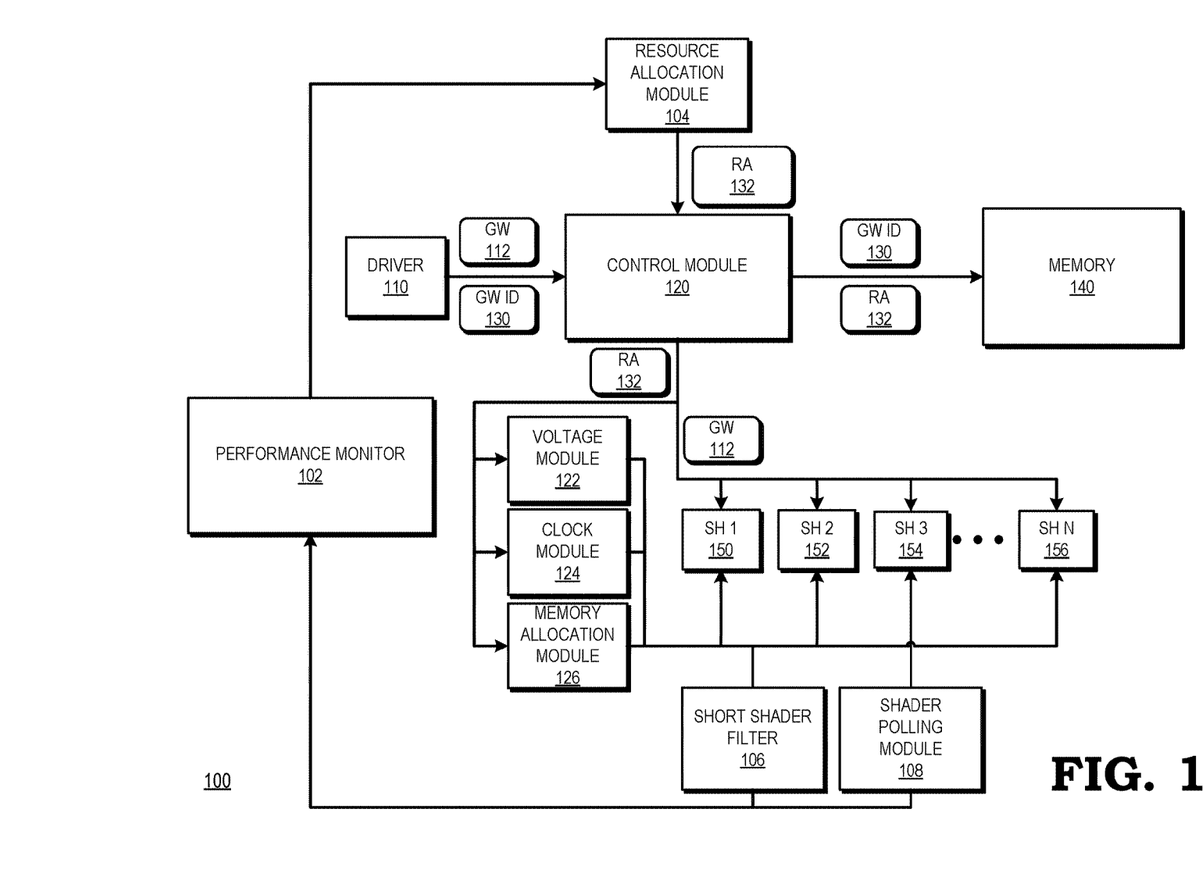
FIG. 1 is a block diagram of a GPU that filters graphics workloads and assigns processing resources for processing graphics workloads that meet filtering criteria based on stored profile of the graphics workload in accordance with some embodiments.

FIG. 1 illustrates an example of a GPU 100 configured to filter graphics workloads to identify candidates for profiling, and balance workloads across a plurality of shaders for filtered graphics workloads in accordance with some embodiments. The GPU 100 can be employed in any of a variety of devices, such as a personal computer, mobile device such as a smartphone, tablet, a video player, a video game console, a casino gaming device and the like. To support processing of graphics workloads, GPU 100 comprises a driver 110, control module 120, short shader filter 106, shader polling module 108, performance monitor 102, a resource allocation module 104, memory 140, voltage module 122, clock module 124, memory allocation module 126, and shaders SH1 (150), SH2 (152), SH3 (154), ... SHN (156).

Driver 110 is a software module that controls how the GPU 100 interacts with the rest of the computer or device in which the GPU 100 is installed. In particular, the driver 110 provides an interface between the GPU 100 and the operating system and/or hardware of the device that includes the GPU 100. In at least one embodiment, the driver 110 supplies graphics workloads, such as graphics workload 112, to the GPU 100 for processing.

The graphics workload 112 is a set of graphics instructions that, when executed, results in the GPU 100 generating one or more objects for display. For example, the graphics workload 112 can be instructions for rendering a frame or portion of a frame of video or static graphics. The GPU 100 distributes the operations required by the graphics workload among the shaders 150-156. In particular, each of the shaders 150-156 is a processing element configured to perform specialized calculations and execute certain instructions for rendering computer graphics. For example, shaders 150-156 may compute color and other attributes for each fragment, or pixel, of a screen. Thus, shaders 150-156 can be two-dimensional (2D) shaders such as pixel shaders, or three-dimensional shaders such as vertex shaders, geometry shaders, or tessellation shaders, or any combination thereof. As described further herein, the shaders work in parallel to execute the operations required by graphics workload 112.

Each graphics workload 112 may present different computational demands for each of the plurality of shaders 150-156. Thus, for example, the graphics workload 112 could require shader SH1 150 to perform a large number of calculations while requiring shader SH2 152 to perform relatively fewer calculations. As a result of the disparate demands placed on the shaders 150 and 152, shader SH1 150 is likely to require a longer time to complete the tasks required by the graphics workload 112, while shader SH2 152 may complete its tasks for processing the graphics workload 112 in a shorter time. The longer time for task completion required by the more heavily tasked shader SH1 150 can create a bottleneck on the GPU 100, leading to decreased efficiency in processing the graphics workload 112. By profiling each graphics workload for the computational demands it places on the various shaders and redistributing resources such as a supplied voltage, clock frequency, and memory allocation available to each of shaders SH1 150 and SH2 152, such that shader SH1 150 is able to complete each of its assigned calculations at a faster rate than shader SH2 152, the likelihood or impact of a bottleneck is reduced.

Some graphics workloads, however, are either of such short duration or require the shaders to expend such a small amount of resources, that profiling the workload and determining a reallocation of resources for the workload consumes more resources than would be saved by reallocating resources. To facilitate filtering of graphics workloads to identify those graphics workloads for which the shaders 150-156 use at least a threshold amount of resources to process, the GPU 100 includes a short shader filter 106. The short shader filter 106 is generally configured to monitor the amount of resources used by the shaders 150-156 to process a graphics workload and compare the amount of resources to a threshold. In some embodiments, the short shader filter 106 is configured to monitor the amount of time spent by the shaders 150-156 processing a graphics workload and compare the amount of time spent to a threshold. If the short shader filter 106 determines that the amount of resources (or time) used to process a graphics workload exceeds the threshold, the short shader filter 106 signals to the performance monitor 102 that the graphics workload meets the resource usage criterion for profiling and resource allocation.

Some graphics workloads are processed simultaneously with other graphics workloads, and cannot therefore be effectively isolated to generate a useful or repeatable resource allocation for an individual workload. Accordingly, profiling during concurrent execution of different workloads at the shader 150-156 consumes system resources (e.g., power) without generating a useful resource allocation. To conserve such system resources, the GPU 100 can filter concurrently executing workloads from the filtering process. To facilitate filtering of graphics workloads that are processed by the shaders 150-156 simultaneously with one or more other graphics workloads, the GPU 100 includes a shader polling module 108. The shader polling module 108 is generally configured to monitor the shaders 150-156 and determine if any of the shaders 150-156 is occupied with simultaneously processing one or more graphics workloads other than graphics workload 112. In some embodiments, the shader polling module 108 is further configured to determine if all of the shaders 150-156 are occupied with processing the graphics workload 112. If the shader polling module 108 determines that all of the shaders 150-156 are occupied solely with processing the graphics workload 112 (i.e., that the shaders 150-156 are dedicated to processing the graphics workload 112), the shader polling module 108 signals to the performance monitor 102 that the graphics workload 112 meets the dedicated processing criterion for profiling and resource allocation.

To facilitate allocation of resources for filtered graphics workloads among the shaders 150-156, the GPU 100 includes a performance monitor 102, a resource allocation module 104, a control module 120, a voltage module 122, a clock module 124, and a memory allocation module 126. The performance monitor 102 is a module configured to record performance characteristics at different modules of the GPU 100, including the shaders 150-156. Thus, the performance monitor 102 can record individual performance information for each of the shaders 150-156, such as cache hit rate, cache miss rate, instructions or operations per cycle executed at the shader, stalls at the shader, and the like. The performance monitor 102 thus records a performance profile across the shaders 150-156 for graphics workloads that meet the criteria of the short shader filter 106 and/or shader polling module 108. In some embodiments, the performance monitor 102 is further configured to programmably aggregate performance information in order to monitor performance across some or all of the shaders. Thus, for those embodiments in which there is no aggregation of data, the performance monitor 102 stores the performance information for each shader at a location in memory. By contrast, for those embodiments in which there is aggregation of data, the performance monitor 102 reads performance information associated with a first shader from memory, adds new performance information for a second shader to the stored performance information for the first shader, and stores the sum of performance information for the first and second shaders at the location in memory. In some embodiments, the performance monitor 102 records the performance information on a "per-workload" basis. That is, in response to the driver 110 providing a new workload to the GPU 100, the performance monitor 102 can reset its stored performance information, so that at a given instance of time the performance information stored at the performance monitor 102 indicates performance characteristics for the currently executing, or most recently executed, graphics workload.

The resource allocation module 104 is generally configured to generate a resource allocation 132 for the shaders 150-156 for filtered graphics workloads based on performance information recorded by the performance monitor 102. In particular, the resource allocation module 104 is configured to generate the resource allocation 132 to allocate more resources to shaders having higher resource needs as indicated by the performance information recorded at the performance monitor 102. To illustrate, in some embodiments the resource allocation module 104 generates the resource allocation 132 to assign a voltage, clock frequency, and amount of memory resources to be allocated to each of the shaders 150-156. The resource allocation module 104 can generate the resource allocation to assign a higher voltage, clock frequency, amount of memory resources, or a combination thereof, to shaders whose performance information indicates a higher processing demand at the shader. Thus, for example, if the performance information for a given shader indicates that the shader is generating a high number of memory access requests, the resource allocation module 104 can generate the resource allocation 132 to assign a higher amount of memory resources to that shader than to shaders generating fewer memory access requests.

The control module 120, voltage module 122, clock module 124, and memory allocation module 126 are generally configured to supply resources to the shaders 150-156 based on the resource allocation 132. To illustrate, the voltage module 122 is generally configured to provide an individual reference voltage to each of the shaders 150-156, wherein each shader uses the reference voltage to set the threshold voltage for transistors and other components of the shader. The voltage module 122 can set the reference voltage for each shader individually, and can therefore set the reference voltage for one shader to a different level than the reference voltage for a different shader. The clock module 124 is configured to supply clock signals to each of the shaders 150-156, and can set the frequency of the clock signal supplied to each shader individually. Thus, the clock module 124 can supply a clock signal to one shader at a higher frequency than the clock signal supplied to a different shader. The memory allocation module 126 is configured to supply parameters to each of the shaders 150-156 indicating memory resources allocated to that shader. The parameters can include, for example, address information, pointer information, and the like indicating what memory resources have been assigned to a shader. The memory allocation module 126 can supply different parameters to different shaders, thereby assigning different memory resources to each shader.

The control module 120 is generally configured to control each of the voltage module 122, clock module 124, and memory allocation module 126, such that each module supplies resources to the shaders 150-156 according to the resource allocation 132. Thus, the control module 120 provides control signaling to the voltage module 122 so that the voltage module 122 provides reference voltages to the shaders 150-156, wherein the reference voltage provided to each shader is individually indicated by the resource allocation 132. Similarly, the control module 120 provides control signaling to the clock module 124 and the memory allocation module 126 so that the modules supply a clock signal and memory resource parameters, respectively, to the shaders 150-156 as indicated by the resource allocation 132. The control module 120 thereby allocates the resources of the GPU 100 to the shaders 150-156 individually according to the resource allocation 132. This allows the GPU 100 to individually tailor the resource allocation among the shaders 150-156 based on the filtered graphics workload 112, reducing the likelihood that the workload will cause a bottleneck at one of the shaders 150-156, or reducing the duration of any such bottleneck.

In some embodiments, the recording of performance information by the performance monitor 102 and the generation of the resource allocation 132 by the resource allocation module 104 can impact performance at the GPU 100 by, for example, consuming power, reducing the speed with which the GPU 100 can execute operations, and the like. Accordingly, to reduce the performance impact, the GPU 100 can record the resource allocation for a workload at a memory 140. In response to subsequently receiving the same or a similar workload from the driver 110, the GPU 100 can apply the stored resource allocation to the shaders 150-156 to process the workload.

To illustrate, the driver 110 provides each workload to the GPU 100 with an accompanying workload identifier, such as workload identifier 130 for graphics workload 112. The control module 120 accesses the memory 140 to determine if there is a stored resource allocation corresponding to the workload identifier. If not, the control module 120 informs the resource allocation module 104 and performance monitor 102, which signals the short shader filter 106 and the shader polling module 108 to filter the graphics workload 112 and determine whether to generate a resource allocation for the graphics workload 112. If the graphics workload 112 meets the filtering criteria of the short shader filter 106 and the shader polling module 108, the performance monitor 102 and resource allocation module 104 together generate a resource allocation for the graphics workload as described above. Based on the resource allocation, the control module 120 controls the voltage module 122, clock module 124, and memory allocation module 126 to provide resources individually to the shaders 150-156. In addition, the control module 120 stores the resource allocation along with the corresponding workload identifier at the memory 140. In some embodiments, if the graphics workload 112 does not meet the resource threshold of the short shader filter 106, the control module stores an indication of a short graphics workload along with the corresponding workload identifier at the memory 140.

When the workload is again supplied by the driver 110 at a subsequent time, the control module 120 identifies that the workload identifier is stored at the memory 140. In response, the control module 120 retrieves the stored resource allocation from the memory 140, and controls the voltage module 122, clock module 124, and memory allocation module 126 to supply resources to the shaders 150-156 according to the stored resource allocation. By storing resource allocations at the memory 140 and applying the stored resource allocation for each instance of a given workload, the GPU 100 can efficiently assign resources for different workloads without significantly impacting processing performance. If the control module 120 identifies that the workload identifier is stored at the memory 140 and is associated with an indication that the graphics workload is a short graphics workload, the control module 120 signals the performance monitor 102 to refrain from signaling the short shader filter 106 and shader polling module 108 to filter the workload, and signals the voltage module 122, clock module 124, and memory allocation module 126 to supply resources to the shaders 150-156 according to a default allocation. By storing an indication that a given workload is a short workload, the GPU 100 can skip the filtering and resource allocation processes for subsequent receipts of the same or a similar short workload, thus conserving filtering and resource allocation resources for more resource-intensive workloads.

Figure 2:
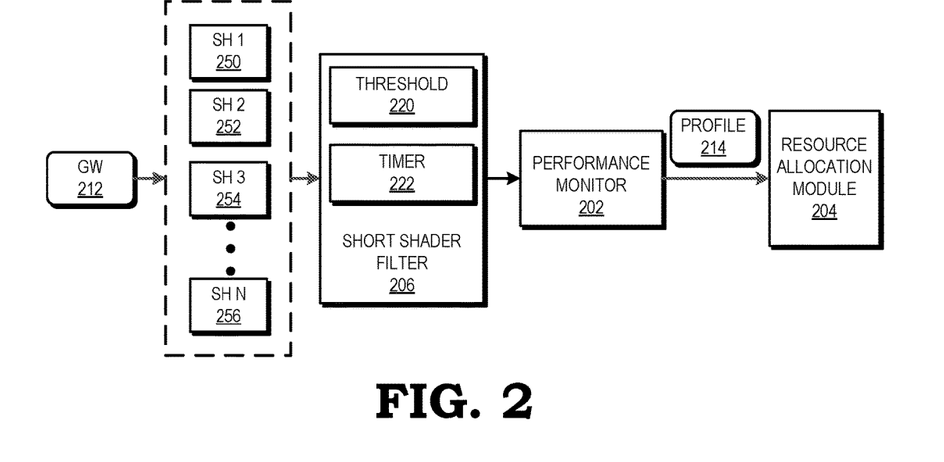
FIG. 2 is a block diagram of an example of a short shader filter of the GPU of FIG. 1 monitoring a plurality of shaders as the shaders process a graphics workload, and signaling a performance monitor and resource allocation module to generate a profile and resource allocation for a graphics workload that meets a resource usage threshold in accordance with some embodiments.

FIG. 2 illustrates an example of a short shader filter of FIG. 1 filtering a graphics workload based on the amount of time a workload is processed at the shaders, in accordance with some embodiments. In the depicted example, the short shader filter 206 monitors the plurality of shaders 250-256 as they receive and process a graphics workload 212. The short shader filter 206 includes a timer 222 that is configured to measure the amount of time the shaders 250-256 take to process the graphics workload 212. The timer 222 starts timing when the graphics workload 212 enters the plurality of shaders 250-256, and stops timing when the plurality of shaders 250-256 complete execution of operations for the graphics workload 212. The short shader filter 206 compares the elapsed time measured by the timer 222 to a programmable threshold amount of time 220. If the elapsed time measured by the timer 222 exceeds the threshold amount of time 220, the short shader filter asserts a signal such as a valid bit to the performance monitor 202, indicating that the graphics workload 212 meets the resource usage criterion for profiling and generating a resource allocation.

In some embodiments, the short shader 206 filter includes a resource consumption monitor (not shown) in lieu of or in addition to the timer 222. The resource consumption monitor (not shown) measures the amount of resources used by the plurality of shaders 250-256 to process the graphics workload 212. The resources measured may include voltage, clock speed, and amount of memory used by each of the shaders 150-156. The short shader filter 206 compares the amount of resources measured by the resource consumption monitor (not shown) to a programmable threshold 220. If the amount of resources measured by the resource consumption monitor (not shown) exceeds the threshold amount of resources 220, the short shader filter asserts a signal such as a valid bit to the performance monitor 202, indicating that the graphics workload 212 meets the resource usage criterion for profiling and generating a resource allocation. In some embodiments, if the short shader filter 206 determines that the amount of time (or resources) used by the shaders 250-256 does not exceed the threshold 220, the short shader filter 206 stores an indication of a short graphics workload and a workload identifier at a memory (not shown).

If the short shader filter 206 asserts a signal such as a valid bit to the performance monitor 202, indicating that the graphics workload 212 meets the resource usage criterion for profiling and generating a resource allocation, the performance monitor 202 collects and aggregates performance data from each of the shaders (not shown) and generates a profile 214 of the computational demands the graphics workload 212 places on each of the shaders (not shown). The performance monitor 202 then sends the profile 214 to the resource allocation module 204. The resource allocation module 204 generates a resource allocation for the graphics workload 212 based on the profile 214.

Figure 3:
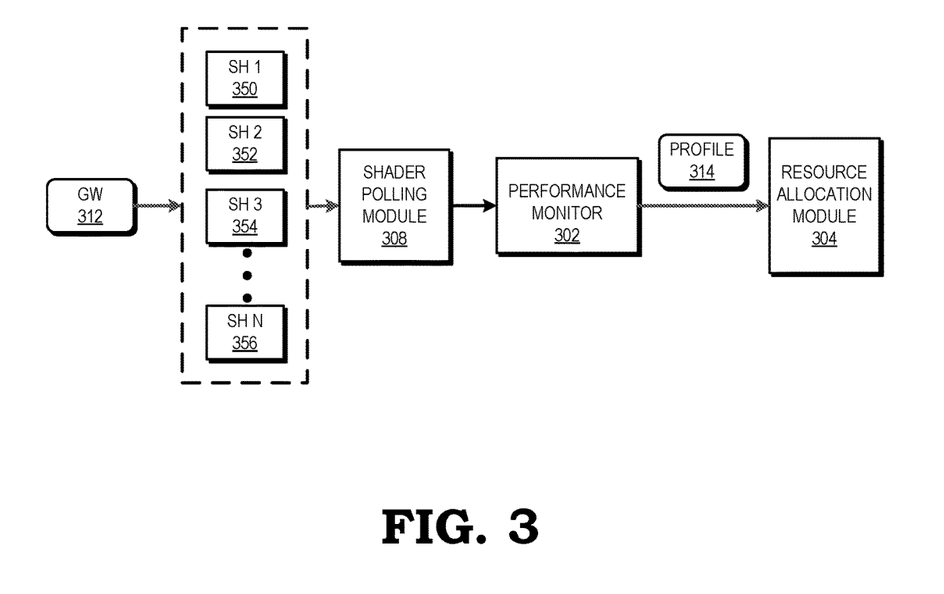
FIG. 3 is a block diagram of an example of a shader polling module of the GPU of FIG. 1 monitoring a plurality of shaders as the shaders process a graphics workload, and signaling a performance monitor to generate a profile and a resource allocation module to generate a resource allocation for a graphics workload that meets a dedicated processing requirement in accordance with some embodiments.

FIG. 3 illustrates an example of a shader polling module of the GPU of FIG. 1 that identifies concurrent execution of different workloads at the GPU to facilitate profile filtering for such workloads. The shader polling module 308 monitors a plurality of shaders 350-356 as the shaders process a graphics workload 312, and signals a performance monitor 302 to profile and a resource allocation module 304 to generate a resource allocation for a graphics workload that meets a dedicated processing criterion in accordance with some embodiments. In the depicted example, as the plurality of shaders 350-356 receives and processes a graphics workload 312, the shader polling module 308 polls each of the shaders 350-356 to determine whether any of the shaders 350-356 is processing a graphics workload other than graphics workload 312 at the same time it is processing graphics workload 312 (i.e., whether the shaders 350-356 are dedicated to processing the graphics workload 312). Thus, the shader polling module 308 determines whether graphics workload 312 is the sole graphics workload being processed by each of the shaders 350-356. In some embodiments, the shader polling module 308 further polls the shaders 350-356 to determine if every one of the shaders 350-356 is processing the graphics workload 312. In such embodiments, the shader polling module 308 determines whether every shader 350-356 is solely occupied with processing graphics workload 312.

In some embodiments, the shader polling module 308 searches an in-flight shader array (not shown) to determine whether the shaders 350-356 are dedicated to processing the graphics workload 312. The in-flight shader array (not shown) tracks the operations being executed by each of the shaders 350-356 at a given time. By searching the in-flight shader array (not shown), the shader polling module 308 can determine whether each of the operations being executed by each of the shaders 350-356 at a given time are associated with the graphics workload 312. The shader polling module 308 can further determine from searching the in-flight shader array (not shown) whether every one of the shaders 350-356 is executing operations associated with the graphics workload 312 at a given time.

If the shader polling module 308 determines that the graphics workload 312 meets the dedicated processing criterion, the shader polling module 308 asserts a signal such as a valid bit to the performance monitor 302, indicating that the graphics workload 312 meets the dedicated processing criterion for profiling and generating a resource allocation. If the shader polling module 308 determines that the graphics workload 312 does not meet the dedicated processing criterion, the shader polling module 308 does not assert a signal such as a valid bit to the performance monitor 302, and the graphics workload 312 is not profiled. However, upon a subsequent receipt of graphics workload 312 by the shaders 350-356, the shader polling module 308 makes a new determination of whether the graphics workload 312 meets the dedicated processing criterion, even if upon an initial receipt the graphics workload 312 is not profiled due to failure to meet the dedicated processing criterion.

If the shader polling module 308 asserts a signal such as a valid bit to the performance monitor 302, indicating that the graphics workload 312 meets the dedicated processing criterion for profiling and generating a resource allocation, the performance monitor 302 collects and aggregates performance data from each of the shaders (not shown) and generates a profile 314 of the computational demands the graphics workload 312 places on each of the shaders (not shown). The performance monitor 302 then sends the profile 314 to the resource allocation module 304. The resource allocation module 304 generates a resource allocation for the graphics workload 312 based on the profile 314.

In some embodiments, the performance monitor 102 of FIG. 1 profiles the graphics workload 112 only upon receiving a signal such as a valid bit from both the short shader filter 106 and the shader polling module 108. Thus, in such embodiments, only those graphics workloads that meet both the resource usage and dedicated processing criteria are profiled by the performance monitor 102.

Figure 4:
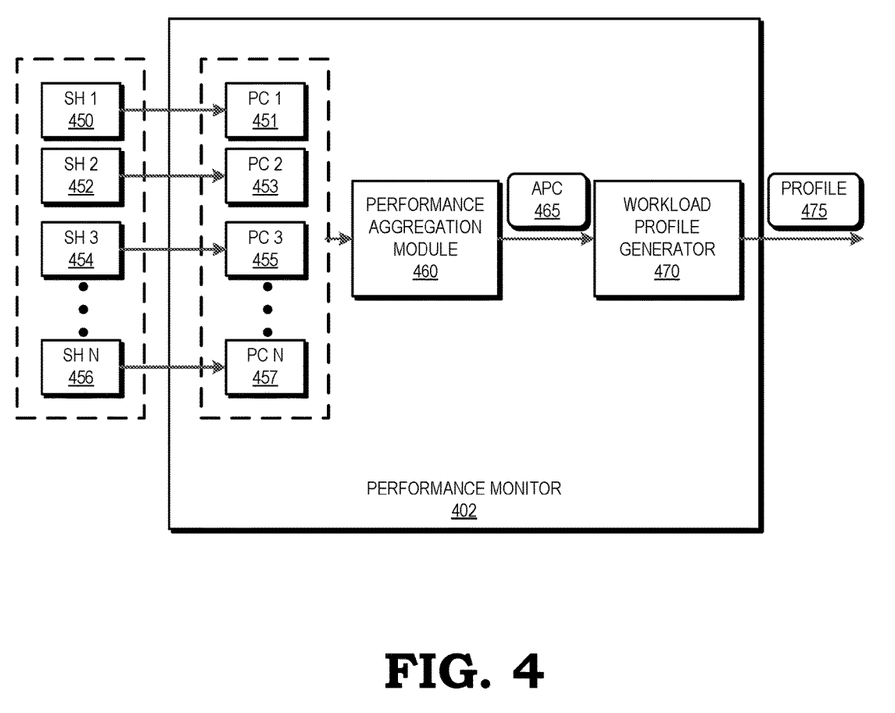
FIG. 4 is a block diagram of an example of a performance monitor of the GPU of FIG. 1 aggregating performance data from a plurality of shaders to generate a profile for a graphics workload in accordance with some embodiments.

FIG. 4 illustrates an example of a performance monitor of the GPU of FIG. 1 aggregating performance data from a plurality of shaders to characterize the distribution of demands on selected subsets of shaders placed by a graphics workload and generate a profile for a graphics workload in accordance with some embodiments. In the depicted example, performance monitor 402 includes a plurality of performance counters 451-457, each of which corresponds with an associated one of the plurality of shaders 450-456, a performance aggregation module 460, and a workload profile generator 470. As the shaders 450-456 process a graphics workload, the performance counters 451-457 measure performance characteristics such as voltage applied, clock speed applied, memory allocated, and processing duration for each of the corresponding shaders 450-456. Once the shaders 450-456 complete processing of the graphics workload (not shown), each of the performance counters 451-457 sends the measured performance characteristics for the corresponding shaders 450-456 for the graphics workload to the performance aggregation module 460. The performance aggregation module 460 aggregates the measured performance characteristics across selected subsets of the shaders 450-456 and outputs the aggregated performance characteristics (APC) 465 for the graphics workload to the workload profile generator 470. For example, to aggregate the performance characteristics arithmetic for shaders 450 and 452, the performance aggregation module 460 reads measured arithmetic characteristics for shader 450 from the associated performance counter 451 and stores the arithmetic characteristics at a location in memory (not shown). The performance aggregation module 460 then reads the measured arithmetic characteristics for shader 452 from the associated performance counter 453 and adds the arithmetic characteristics for shader 452 to the stored arithmetic characteristics for shader 450, and stores the sum of measured arithmetic characteristics for shaders 450 and 452 at the location in memory (not shown). In a similar fashion, the performance aggregation module 460 aggregates other measured performance characteristics, such as clock frequency and memory resources, for shaders 450 and 452, and for other subsets of shaders, such as shaders 454 and 456.

The workload profile generator 470 receives the aggregated performance characteristics 465 for the graphics workload and generates a profile 475 of the performance characteristics across the subsets of shaders 450-456 for the graphics workload. The profile 475 characterizes the processing demands placed by the graphics workload on each of a plurality of subsets of the shaders 450-456. The performance monitor 402 outputs the profile 475 to the resource allocation module (not shown), which generates a resource allocation for each subset of the shaders 450-456 for the graphics workload based on the profile 475.

Figure 5:
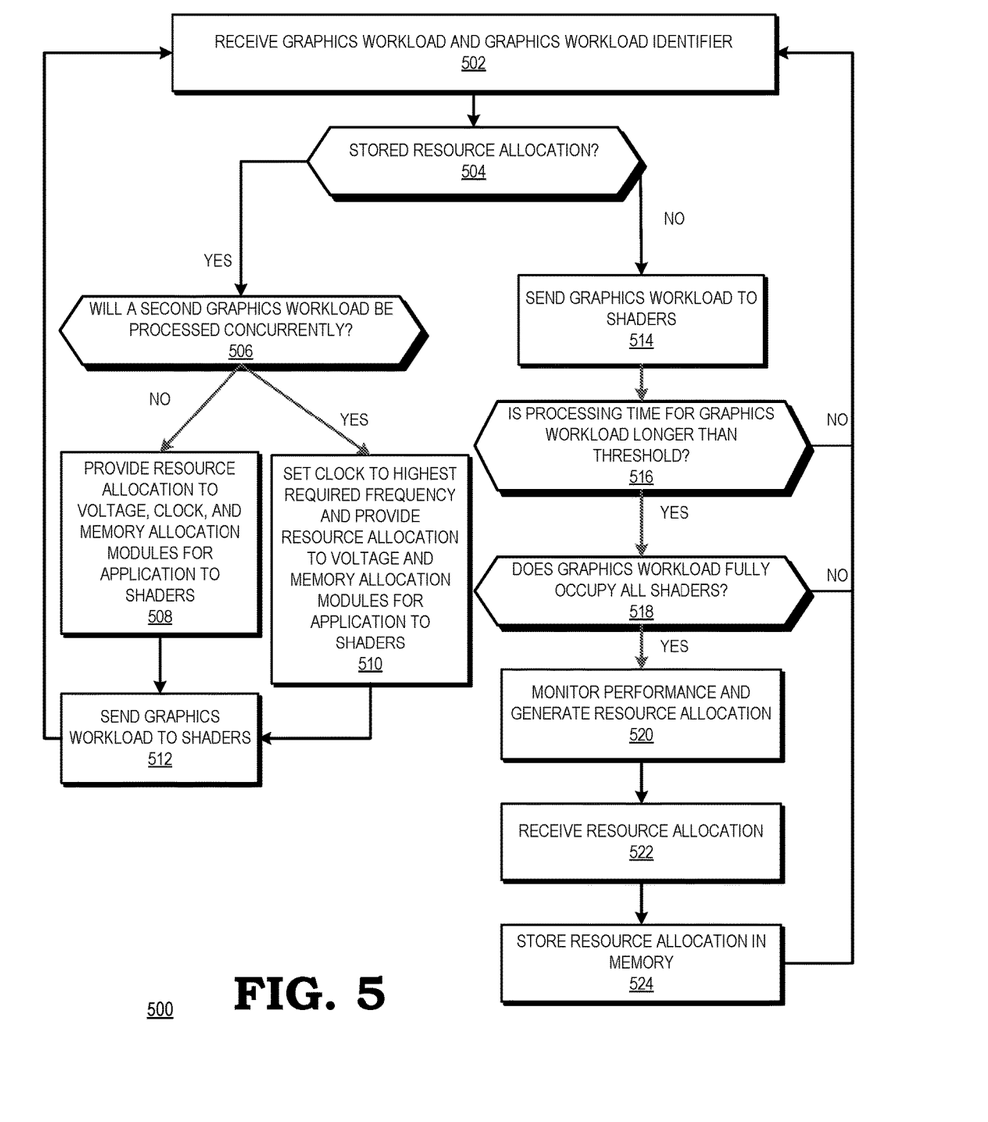
FIG. 5 is a flow diagram illustrating a method for filtering graphics workloads and profiling and storing a resource allocation by a GPU for a graphics workload that meets filtering criteria, and applying the resource allocation when the same or a similar graphics workload is subsequently received by the GPU in accordance with some embodiments.

FIG. 5 illustrates a method for filtering graphics workloads, profiling and storing a resource allocation for a graphics workload that meets filtering criteria, and applying the resource allocation when the same or a similar graphics workload is subsequently received by the GPU in accordance with some embodiments. For purposes of description, the method 500 is described with respect to an example implementation at the GPU 100 of FIG. 1. At block 502, the driver 110 provides the GPU 100 with a workload 112 and an identifier 130 for the workload 112. At block 504, the control module 120 determines whether the received workload identifier 130 is stored at the memory 140 along with a previously generated resource allocation 132. If so, the method flow proceeds to block 506, where the control module 120 determines whether a second graphics workload will be processed concurrently with the received graphics workload 112. If not, the method flow proceeds to block 508, where the control module 120 retrieves the stored resource allocation 132 and supplies control signaling to the voltage module 122, the clock module 124, and the memory allocation module 126 to provide, respectively, reference voltages, clock signals, and memory resource parameters to each of the shaders 150-156 consistent with the stored resource allocation 132. If at block 506, the control module 120 determines that a second graphics workload is scheduled to be processed concurrently with the graphics workload 112, the method flow proceeds to block 510, where the control module retrieves the stored resource allocation 132 and supplies control signaling to the voltage module 122 and the memory allocation module 126 to provide, respectively, reference voltages and memory resource parameters to each of the shaders 150-156 consistent with the stored resource allocation. However, because there are multiple graphics workloads that will be processed simultaneously, at block 510 the control module 120 supplies control signaling to the clock module 124 to provide clock signals to each of the shaders 150-156 consistent with the higher of the clock speed designated by the stored resource allocation 132 and the clock speed designated for the second graphics workload. The method flow proceeds to block 512 and the control module provides operations of the received graphics workload(s) to the shaders 150-156, which execute the operations using the allocated resources, as governed by the stored resource allocation or the designated higher clock speed. The method flow then returns to block 502 for the GPU 100 to receive another graphics workload.

Returning to block 504, if the control module 120 determines that the memory 140 does not store an identifier for the received graphics workload, the method flow proceeds to block 514 and the control module 120 provides operations of the received workload to the shaders 150-156 for execution. In some embodiments, the control module 120 provides control signaling to the voltage module 122, the clock module 124, and the memory allocation module 126 to provide substantially equal resources to each of the shaders 150-156 to execute the operations, such as the same reference voltage, the same clock signal frequency, and similar memory allocation parameters. At block 516, the short shader filter 106 measures the processing time for the graphics workload and compares it to a threshold to determine if the processing time is longer than the threshold. If not, the method flow returns to block 502 for the GPU 100 to receive another graphics workload.

If at block 516, the short shader filter 106 determines that the processing time for the graphics workload exceeds the threshold, the method flow proceeds to block 518, where the shader polling module 108 determines whether the shaders 150-156 are dedicated to processing the received graphics workload. If the shaders 150-156 are not dedicated to processing the received graphics workload, the method flow returns to block 502 for the GPU 100 to receive another graphics workload.

If at block 518, the shader polling module 108 determines that the shaders 150-156 are dedicated to processing the graphics workload 112, the method flow proceeds to block 520, where the performance monitor 102 records performance information for the shaders 150-156 based on their execution of the operations for the received workload. Based on the performance information, the resource allocation module 104 generates a resource allocation for the shaders 150-156 to reduce potential bottlenecks for the workload. At block 522 the control module 120 receives the generated resource allocation and at block 524 the control module 120 stores the resource allocation at the memory 140 along with the identifier for the graphics workload upon which the resource allocation is based. The method flow returns to block 502 for the GPU 100 to receive another graphics workload.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving at a plurality of shaders a first graphics workload;
   in response to the plurality of shaders using less than a threshold amount of resources to process the first graphics workload,
     storing a first workload identifier; and
     applying a default resource allocation to the plurality of shaders when a second graphics workload having the first workload identifier is subsequently received by the plurality of shaders; and
   in response to the plurality of shaders using more than the threshold amount of resources,
     determining by a performance monitor a resource allocation for the first graphics workload;
     storing the resource allocation and a second workload identifier that is different than the first workload identifier; and
     applying the resource allocation to the plurality of shaders when a second graphics workload having the second workload identifier is subsequently received by the plurality of shaders.

2. The method of claim 1, further comprising:
   determining by the performance monitor a resource allocation for the first graphics workload in response to determining that the plurality of shaders is dedicated to processing the first graphics workload.

3. The method of claim 2, wherein determining that the plurality of shaders is dedicated to processing the first graphics workload comprises determining that each shader of the plurality of shaders is processing the first graphics workload and determining that no shader of the plurality of shaders is processing a second graphics workload while the first graphics workload is being processed.

4. The method of claim 1, wherein the resource allocation comprises one or more of a voltage, clock frequency, and memory resource allocation to be applied to one or more of the shaders when processing the first graphics workload.

5. The method of claim 4, further comprising:
   in response to receiving a third graphics workload to be processed by the plurality of shaders concurrently with the second graphics workload, applying to the plurality of shaders the highest clock frequency required either of the stored resource allocation or the third graphics workload.

6. The method of claim 1, wherein determining a resource allocation comprises:
   collecting performance data from a plurality of counters, each counter associated with one or more of the shaders;
   aggregating the collected performance data; and
   allocating resources to each shader based on the aggregated performance data.

7. The method of claim 1, wherein the threshold amount of resources comprises a threshold amount of time.

8. A method comprising:
   receiving a plurality of graphics workloads for processing by a plurality of shaders;
   filtering the received graphics workloads based on a comparison of a plurality of processing characteristics to a threshold, wherein the plurality of processing characteristics comprises an amount of resources used by the plurality of shaders to process a first graphics workload;

bypassing determining resource allocations for graphics workloads in the plurality of graphics workloads that do not meet the threshold; and determining a resource allocation among the plurality of shaders for each filtered graphics workload that meets the threshold.

9. The method of claim 8, wherein the plurality of processing characteristics comprises an amount of resources used by the plurality of shaders to process a first graphics workload.

10. The method of claim 8, wherein the plurality of processing characteristics comprises the plurality of shaders being dedicated to processing the first graphics workload.

11. The method of claim 10, wherein the plurality of shaders being dedicated to processing the first graphics workload comprises each shader of the plurality of shaders executing only the first graphics workload.

12. The method of claim 8, wherein the resources comprise one or more of a voltage, clock frequency, and memory resource allocation to be applied to one or more of the shaders when processing the first graphics workload.

13. The method of claim 8, wherein allocating resources comprises:

collecting workload performance data from a plurality of counters, each counter associated with one or more of the shaders;

aggregating the collected performance data; and setting one or more of a voltage, clock frequency, and memory resource allocation to be applied to one or more of the shaders when processing the first graphics workload based on the aggregated performance data.

14. The method of claim 8, further comprising:

storing the resource allocation; and applying the resource allocation to the plurality of shaders when a second graphics workload having a same workload identifier as the first graphics workload is subsequently received by the plurality of shaders.

15. A device comprising:

a plurality of shaders for processing a first graphics workload; and a performance monitor configured to compare an amount of resources used by the plurality of shaders to process the first graphics workload to a threshold amount of resources, determine a resource allocation for the first graphics workload in response to the plurality of shaders using less than the threshold amount of resources to process the first graphics workload, and wherein the performance monitor is configured to bypass determining the resource allocation for the first graphics workload in response to the first graphics workload not meeting the threshold.

16. The device of claim 15, wherein the performance monitor is further configured to determine a resource allocation for the first graphics workload in response to the plurality of shaders requiring more than a threshold amount of resources to process the first graphics workload.

17. The device of claim 15, further comprising a memory to store the resource allocation and a workload identifier for the first graphics workload.

18. The device of claim 17, wherein the performance monitor is further configured to apply the stored resource allocation to a second graphics workload in response to the second workload having a same workload identifier as the first graphics workload.

19. The device of claim 15, wherein the resource allocation comprises one or more of a voltage, clock frequency, and memory resource allocation to be applied to one or more of the shaders when processing the first graphics workload.

20. The device of claim 15, wherein the performance monitor is to determine a resource allocation by:

collecting performance data from a plurality of counters, each counter associated with one or more of the shaders;

aggregating the collected performance data; and allocating resources to each shader based on the aggregated performance data.

* * * * *